(12) United States Patent
Lai et al.

(10) Patent No.: US 8,393,909 B1
(45) Date of Patent: Mar. 12, 2013

(54) ELECTRICAL CARD CONNECTOR USING A TRAY EJECTABLE BY AN INSERTION PIN

(75) Inventors: Yaw-Huey Lai, New Taipei (TW); Chin-Hwa Wu, Taoyuan county (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 13/222,208

(22) Filed: Aug. 31, 2011

(30) Foreign Application Priority Data

Jun. 29, 2011  (TW) .............................. 100211823 U

(51) Int. Cl.
  *H01R 13/62* (2006.01)
(52) U.S. Cl. ........................................................ 439/159
(58) Field of Classification Search .................. 439/159, 439/630, 157, 946, 152, 153, 326
  See application file for complete search history.

(56) References Cited

U.S. PATENT DOCUMENTS

| 6,089,895 | A  | * | 7/2000  | Hashiguchi et al. ........... | 439/260 |
| 7,184,274 | B2 | * | 2/2007  | Wu et al. ........................ | 361/752 |
| 7,261,577 | B1 | * | 8/2007  | Lai et al. ........................ | 439/159 |
| 2008/0081497 | A1 | * | 4/2008  | Lai .................................. | 439/155 |
| 2008/0165508 | A1 |   | 7/2008  | Wang et al. | |
| 2010/0317211 | A1 | * | 12/2010 | Yamachika et al. ........... | 439/153 |

FOREIGN PATENT DOCUMENTS

TW            M376007           3/2010

* cited by examiner

*Primary Examiner* — Edwin A. Leon
*Assistant Examiner* — Harshad Patel
(74) *Attorney, Agent, or Firm* — Muncy, Geissler, Olds & Lowe, PLLC

(57) ABSTRACT

An electrical card connector includes a housing defining a front insertion opening, one or a number of terminal sets, a tray insertable through the front insertion opening into the housing and having one or a number of card-carrying portions, a recess, a stop wall at one side of the recess, a pin hole and a pin guide formed between the recess and the insertion hole, an elastic member, and an elastic interference device mounted in the housing and extending to the accommodation chamber for interfering with the recess and stopping against the stop wall and having an actuation portion. The elastic interference device is forced away from the recess and the stop wall for enabling the tray to be ejected out of the housing by the elastic member upon insertion of an insertion pin into the pin hole to push the actuation portion.

9 Claims, 18 Drawing Sheets

ELECTRICAL CARD CONNECTOR USING A TRAY EJECTABLE BY AN INSERTION PIN

BACKGROUND OF THE INVENTION

1. Field of the Invention

The present invention relates to memory card connector technology and more particularly, to an electrical card connector, that uses a card-carrying tray ejectable by an insertion pin.

2. Description of the Related Art

Taiwan Patent Publication M376007 discloses an electrical card connector with a tray, wherein the tray is adapted for carrying an electronic memory card (for example, SIM card); when inserted the tray into the electrical card connector, a fastening member (referenced by 21) is fastened up to lock the tray in the inserted position.

According to the aforesaid prior art design, when going to take out the tray, it is necessary to apply an outward pressure to the tray sufficient to overcome the locking force of the fastening member so that the tray can be moved out of the electrical card connector for removal of the attached electronic memory card. This operation method is complicated and inconvenient.

Further, US 20080165508 discloses an electrical card connector using a tray, entitled "Ejectable component assemblies in electronic devices", which uses heads 49A and 49B of tray retainers 46A and 46B to lock tray 20 in the inserted position. When going to take the tray out of the housing of the electronic device, the operation procedure is also complicated.

SUMMARY OF THE INVENTION

The present invention has been accomplished under the circumstances in view. It is the main object of the present invention to provide an electrical card connector, which enables the card-carrying tray to be ejected out of the housing upon insertion of an insertion pin, facilitating the operation.

To achieve this and other objects of the present invention, an electrical card connector comprises: a housing defining an accommodation chamber therein and an insertion opening at a front side thereof in communication with the accommodation chamber; at least one terminal set each consisting of a plurality of metal conducting terminals, at least one terminal set being mounted in the housing and extending to the inside of the accommodation chamber; a tray inserted through the insertion opening into the inside of the housing, the tray comprising at least one card-carrying portion for carrying at least one electronic card member, the at least one card-carrying portion being kept in the accommodation chamber to force the loaded at least one electronic card member into electric contact with the at least one terminal set respectively when the tray is inserted into the housing, a recess at a predetermined location, a stop wall disposed at one side of the recess, a pin hole located on a front side thereof, and a pin guide extending between the pin hole and the recess for guiding an insertion pin that is inserted into the pin hole for enabling a front end of the insertion pin to enter the recess; an elastic member set between the housing and the tray and adapted for ejecting the tray out of the housing; and an elastic interference device mounted in the housing and projecting into the inside of the accommodation chamber to a predetermined distance, the elastic interference device being interfered with the recess and stopped against the stop wall to prohibit the tray from being ejected out of the housing by the elastic member when the tray is inserted into the housing, the elastic interference device comprising an actuation portion extending backwardly obliquely from a body thereof toward the inner side of the accommodation chamber and forcible by the insertion pin to move the elastic interference device out of the recess and away from the stop wall upon insertion of the insertion pin into the recess. Thus, by means of inserting the insertion pin into the housing, the tray is ejected out of the housing. This operation is easy and convenient.

DETAILED DESCRIPTION OF THE INVENTION

Figure 1:
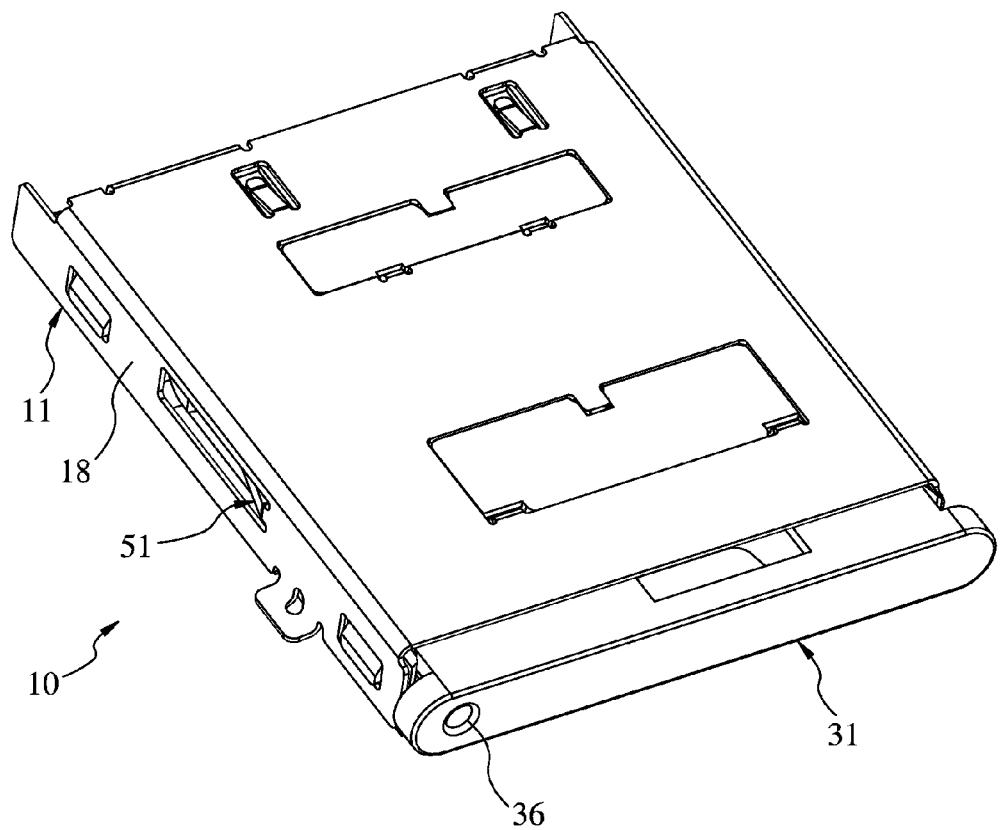
FIG. 1 is an oblique elevational assembly view of an electrical card connector in accordance with a first embodiment of the present invention.
Figure 2:
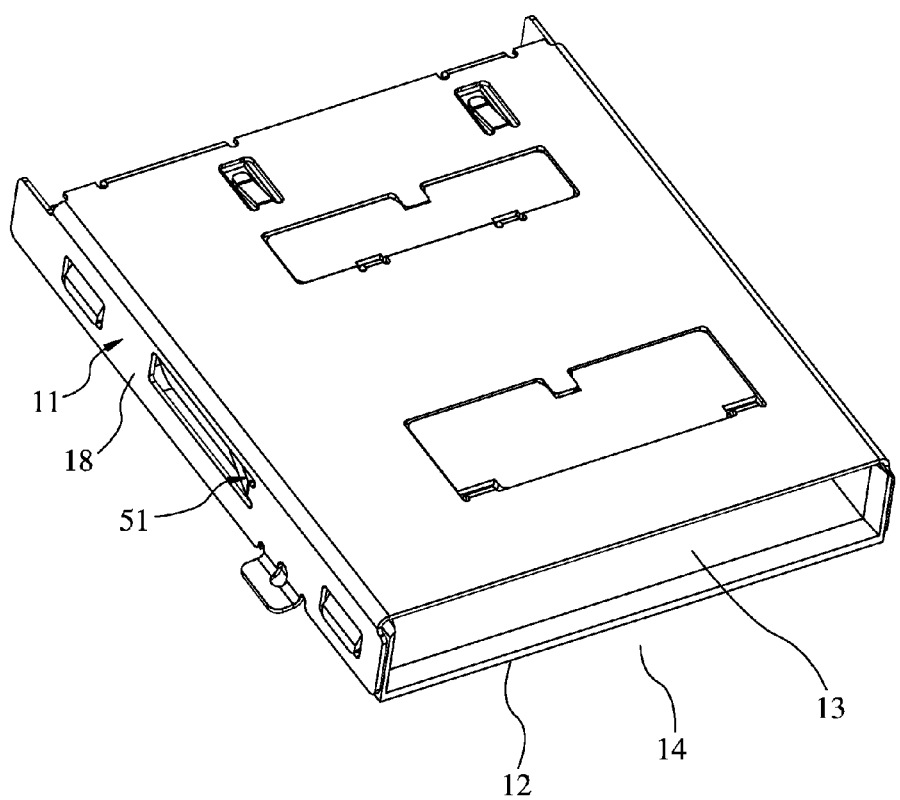
FIG. 2 is another elevational assembly view of the first embodiment of the present invention, illustrating the condition of the electrical card connector after removal of the tray.
Figure 3:
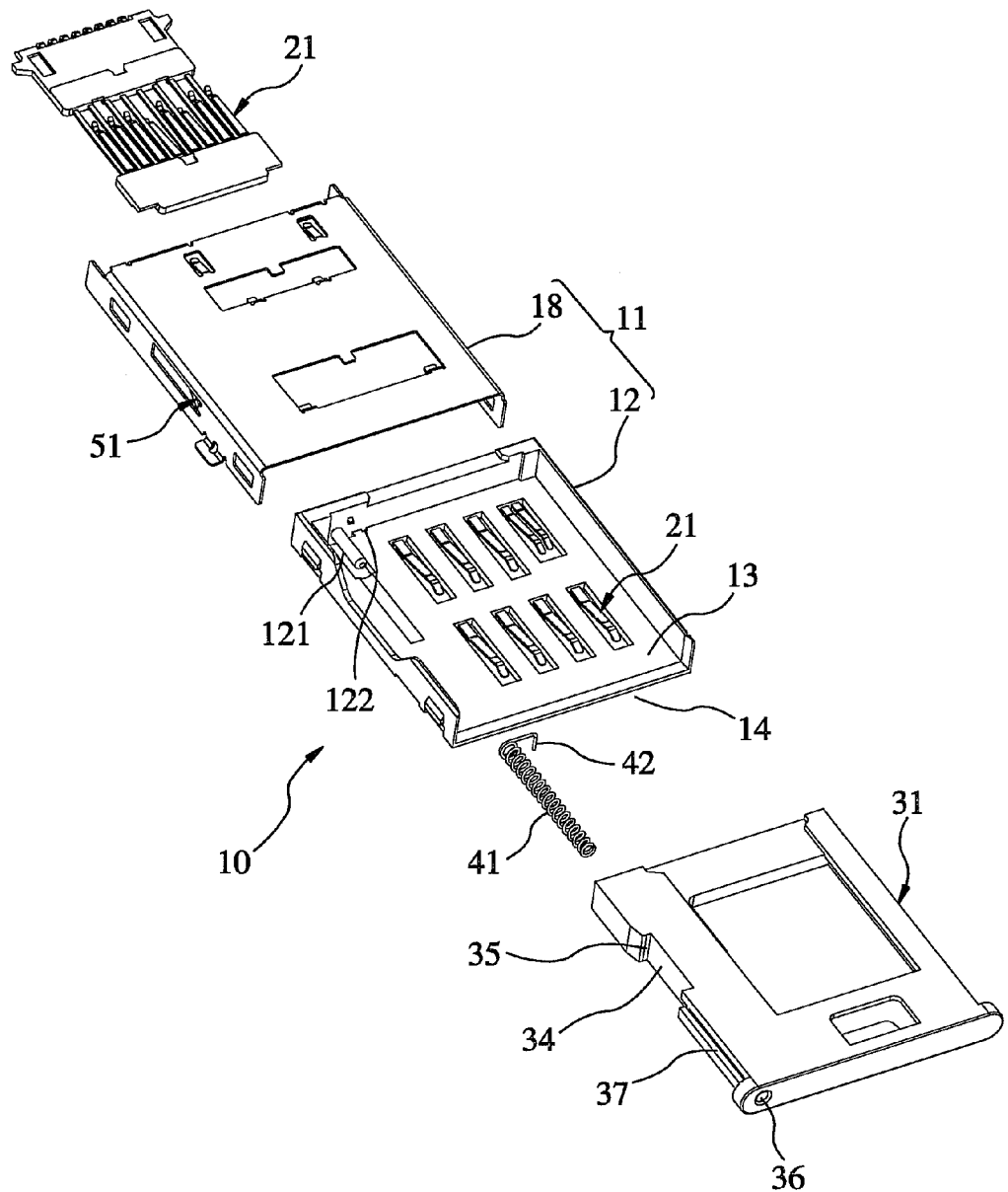
FIG. 3 is an exploded view of the electrical card connector in accordance with the first embodiment of the present invention.
Figure 4:
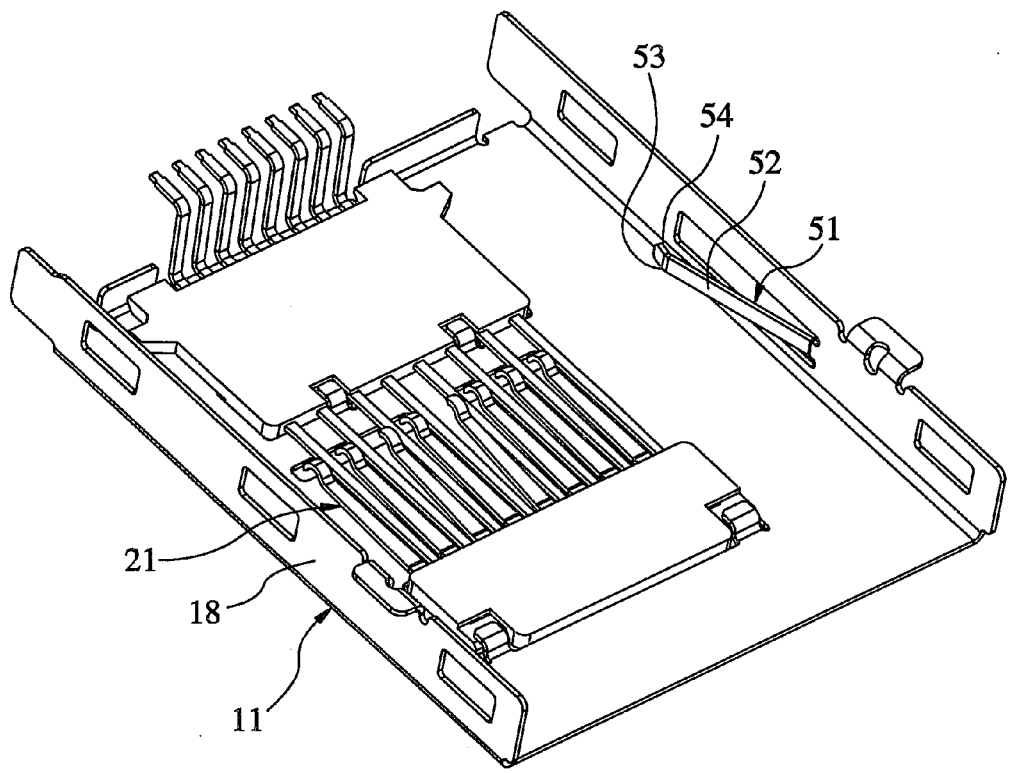
FIG. 4 is an elevational view of a part of the electrical card connector in accordance with the first embodiment of the present invention, illustrating the cover shell turned upside down.
Figure 5:
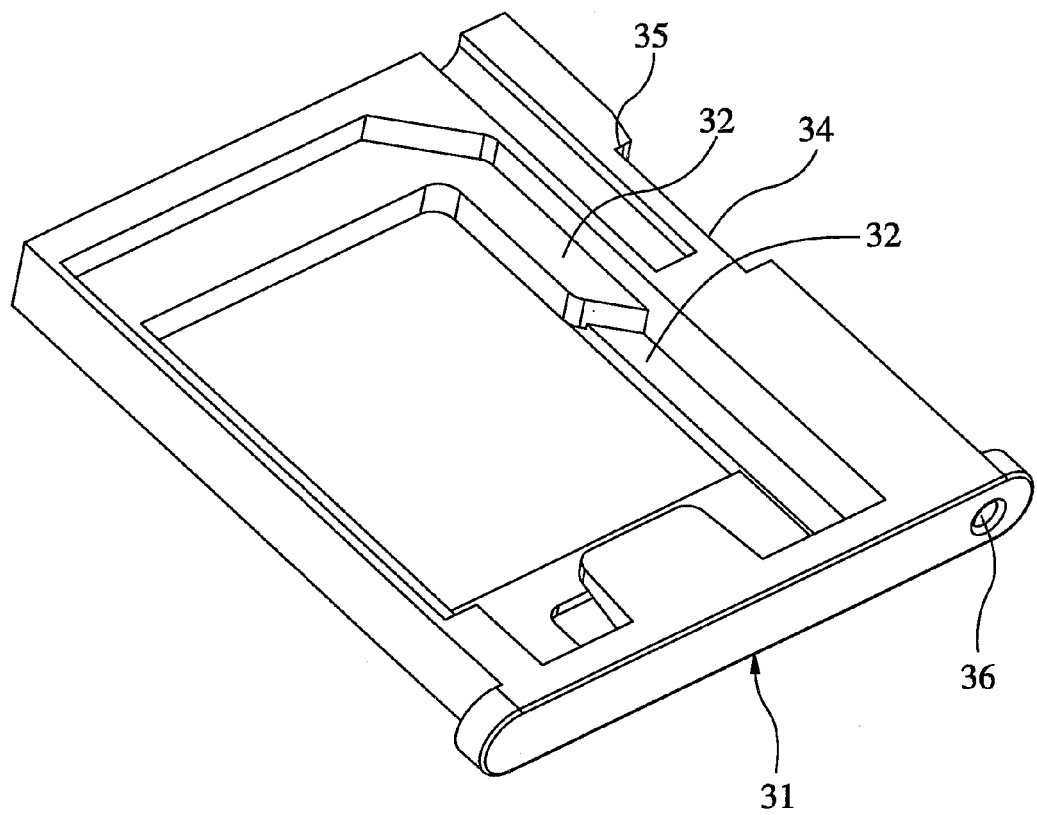
FIG. 5 is an elevational view of a part of the electrical card connector in accordance with the first embodiment of the present invention, illustrating the bottom structure of the tray.

Referring to FIGS. 1-5, an electrical card connector 10 using a tray ejectable by a pin in accordance with a first embodiment of the present invention is shown comprising a housing 11, at least one terminal set 21, a tray 31, an elastic member 41, and an elastic interference device 51.

The housing 11 defines an accommodation chamber 13 therein and an insertion opening 14 at the front side thereof in communication with the accommodation chamber 13. In this embodiment, the housing 11 consists of a base holder shell 12 and a cover shell 18. Further, the housing 11 comprises a locating pin 121 and a retaining portion 122. In this embodiment, the locating pin 121 and the actuation portion 122 are arranged at the base holder shell 12.

The at least one terminal set 21 in this embodiment includes two terminal sets each comprising a plurality of metal conducting terminals. The two terminal sets 21 are respectively mounted in the base holder shell 12 and the cover shell 18 and respectively extending to the inside of the accommodation chamber 13. According to this embodiment, these terminal sets 21 respectively fit two electronic card members (memory cards) 99. This embodiment is simply an example of the present invention. When only one single electronic card member 99 is used, one single terminal set 21 is sufficient, i.e., the number of the at least one terminal set 21 is not limited to one or two but determined subject to the number of electronic card members used.

The tray 31 is inserted through the insertion opening 14 into the housing 11, comprising two card-carrying portions 32 for carrying two electronic card members 99. When inserted the tray 31 into the housing 11, the card-carrying portions 32 are kept in the accommodation chamber 13 to force the two electronic card members 99 into electric contact with the two terminal sets 21 respectively. The tray 31 further comprises a recess 34 at a predetermined location, a stop wall 35 disposed at one side, for example, the rear side of the recess 34, a pin hole 36 located on the front side thereof, a pin guide 37 formed between the pin hole 36 and the recess 34 for guiding an insertion pin 91 that is inserted into the pin hole 36 for enabling the front end of the insertion pin 91 to enter the recess 34. As stated above, the two card-carrying portions 32 are adapted for carrying two electronic card members 99. However, this arrangement is not a limitation. When only one electronic card member 99 is used, the tray 31 can be designed to provide one single card-carrying portion 32 for carrying one single electronic card member 99, i.e., the number of the card-carrying portions 3 is not a limitation. Further, the pin guide 37 can be, for example, an elongated groove located on the tray 31.

The elastic member 41 is set between the housing 11 and the tray 31 to impart an outward pressure to the tray 31 against the housing 11. In this embodiment, the elastic member 41 is a compression spring, having on one end, namely, the rear end thereof sleeved onto the locating pin 121 and stopped against the base holder shell 12 and a mounting portion 42 extended from the rear end and affixed to the retaining portion 122 of the base holder shell 12.

The elastic interference device 51 is mounted in the housing 11 and projecting into the inside of the accommodation chamber 13 to a predetermined distance. In this embodiment, the elastic interference device 51 extends from one lateral side of the cover shell 18 toward the inside of the accommodation chamber 13. When inserted the tray 31 into the housing 11, the elastic interference device 51 is interfered with the recess 34 and stopped against the stop wall 35 to prohibit the tray 31 from being ejected out of the housing 11 by the elastic member 41. Further, the elastic interference device 51 comprises an actuation portion 52 extending backwardly obliquely from the body thereof toward the inner side of the accommodation chamber 13 and terminating in a bent 53 and then an extension portion 54. The extension portion 54 is stopped against the stop wall 35.

Further, the insertion pin 92 is inserted from the outside of the housing 11 into the pin hole 36 and guided by the pin guide 37 into the recess 34 to give a pressure to the actuation portion 52 of the elastic interference device 51, forcing the elastic interference device 51 away from the stop wall 35 and the recess 34.

The operation of the electrical card connector in accordance with the first embodiment of the present invention will be outlined hereinafter.

Figure 6:
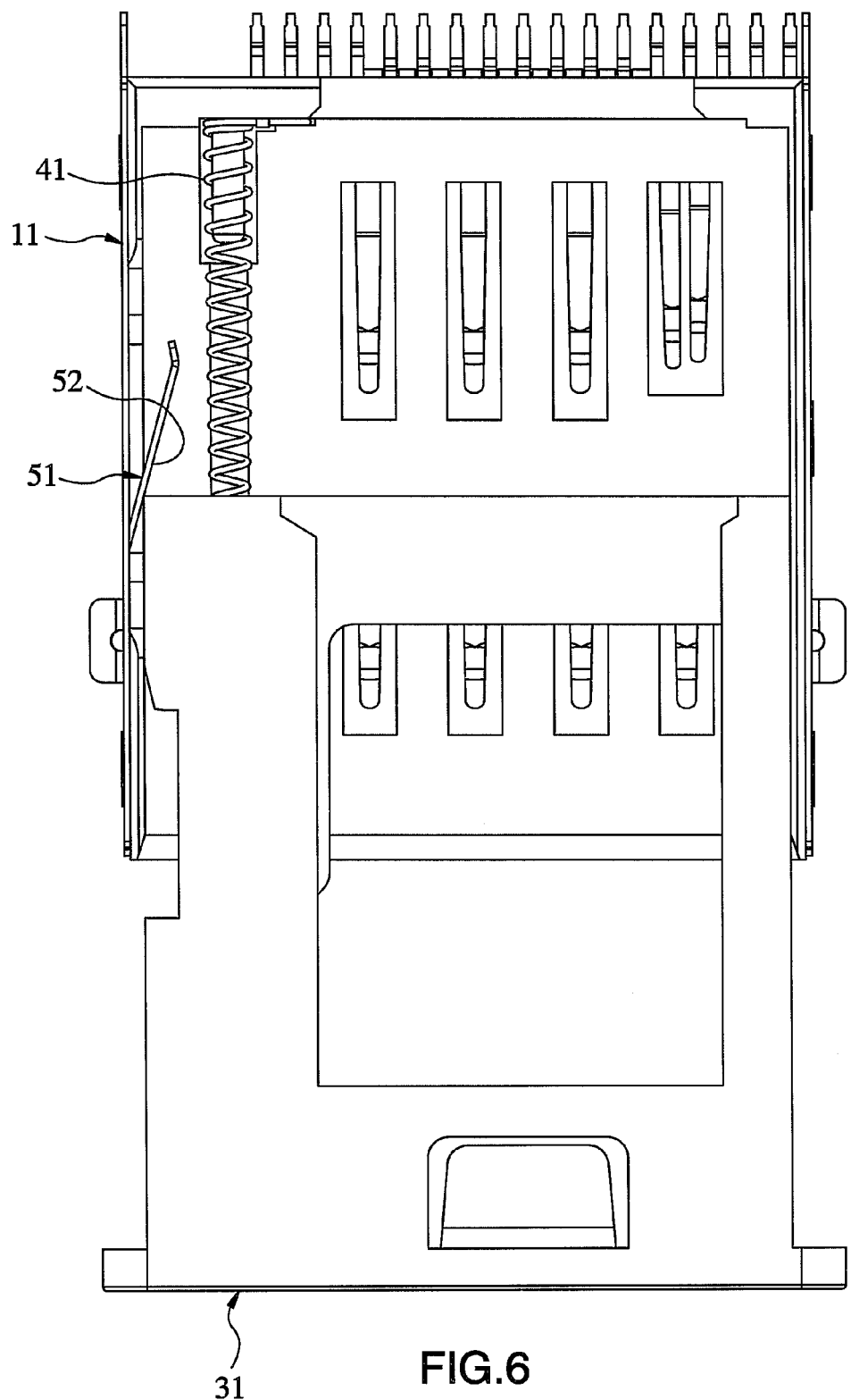
FIG. 6 is a schematic first operational view of the first embodiment of the present invention illustrating the tray in the inserted position and the cover member removed from the housing.
Figure 7:
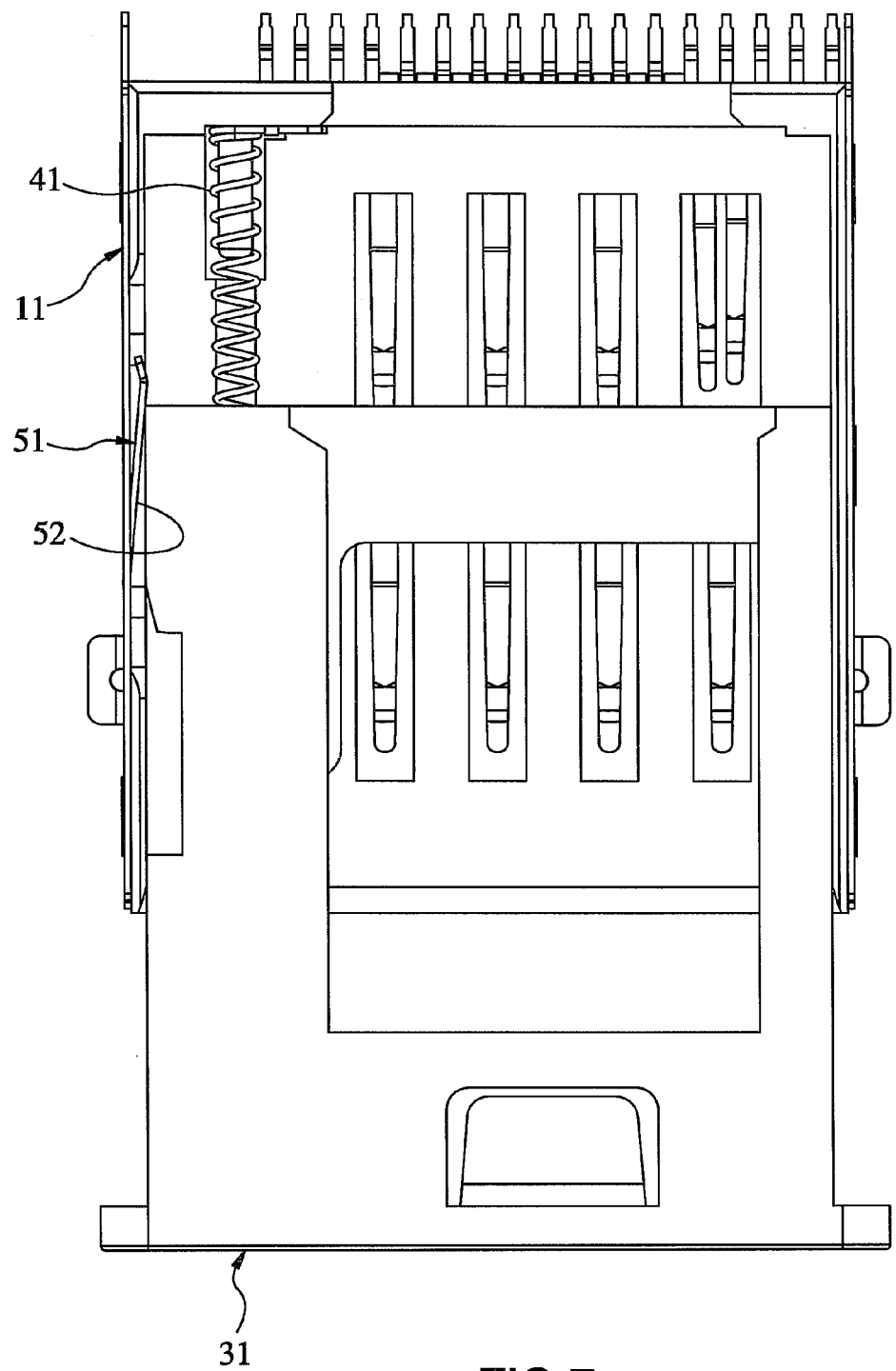
FIG. 7 is a schematic second operational view of the first embodiment of the present invention.
Figure 8:
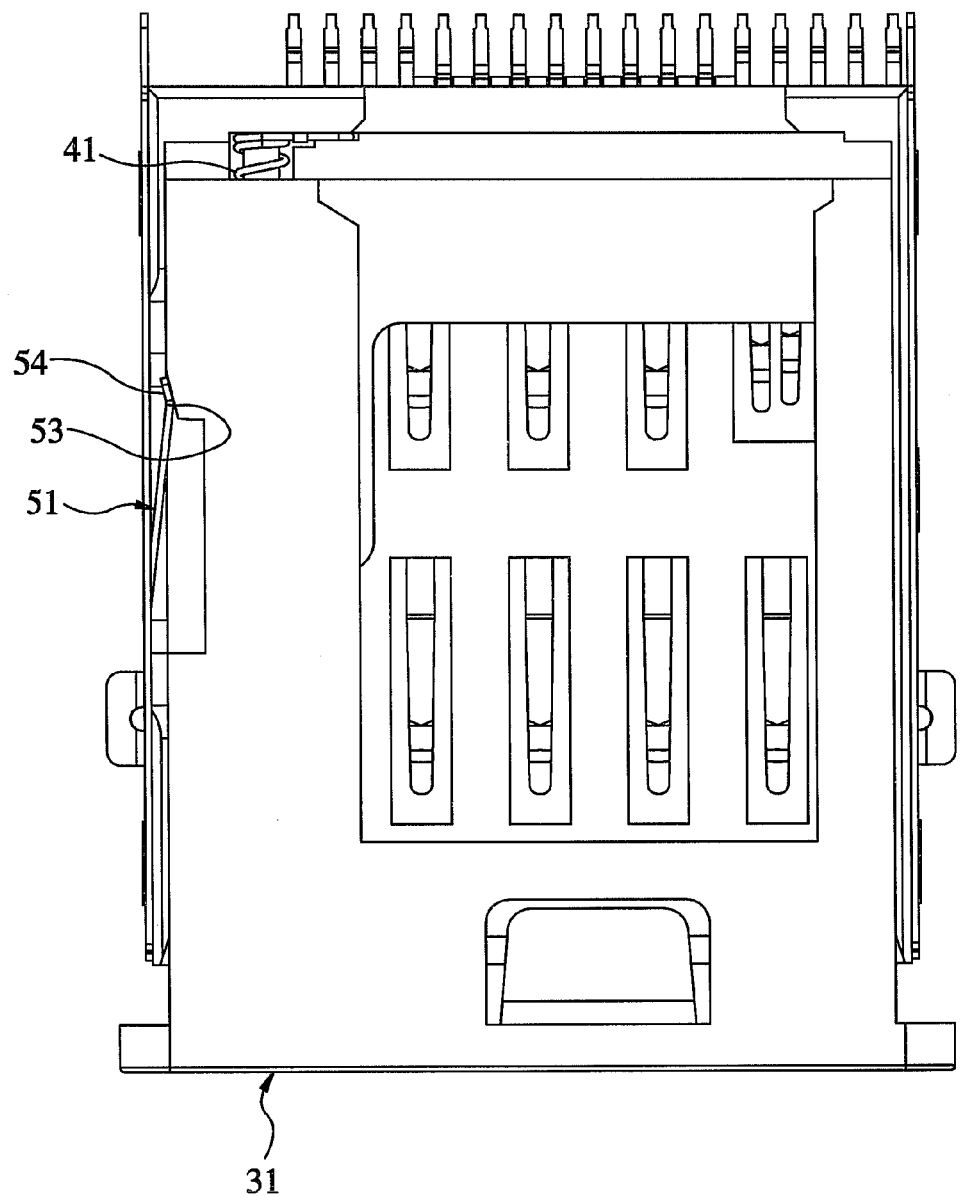
FIG. 8 is a schematic third operational view of the first embodiment of the present invention.
Figure 9:
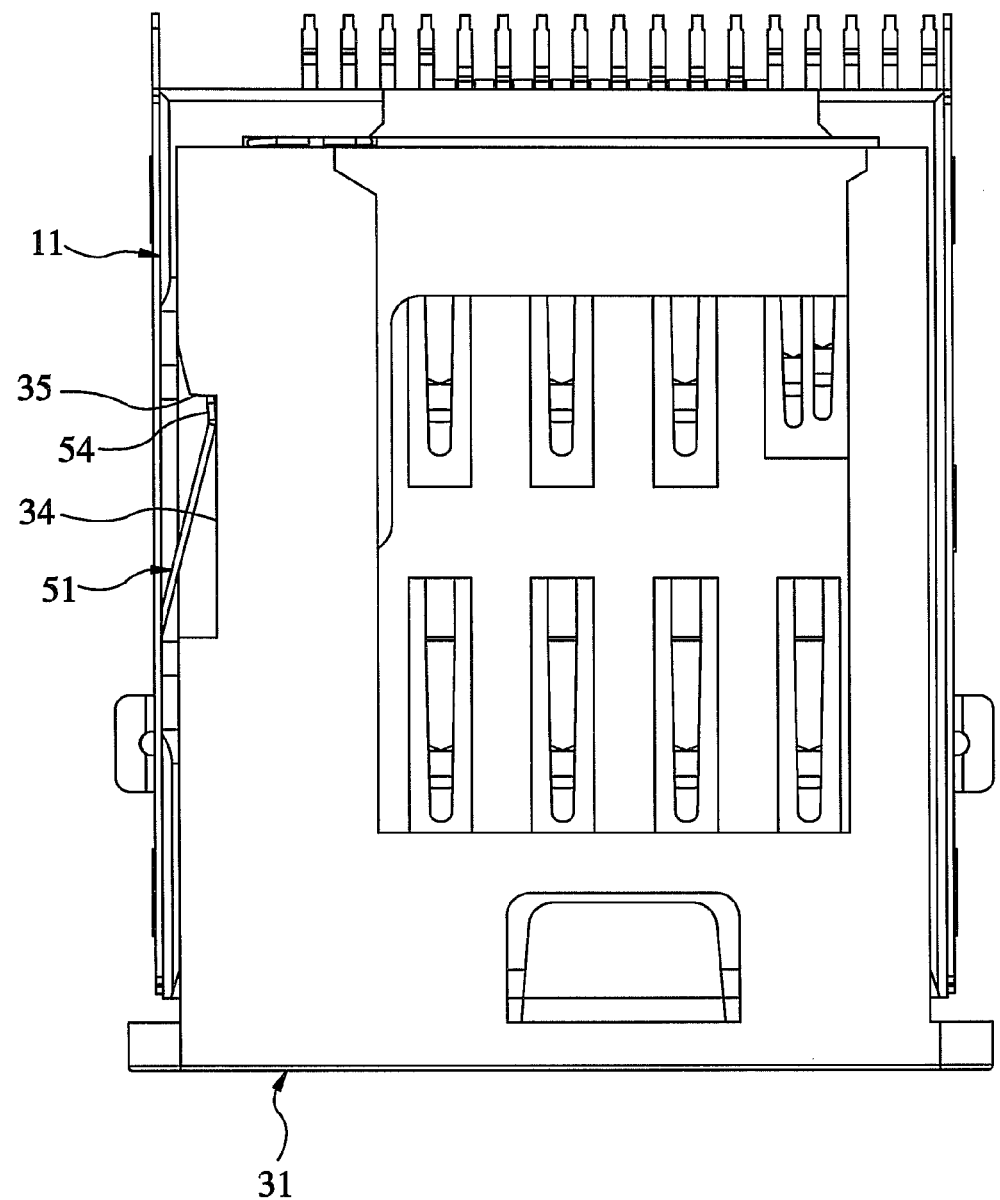
FIG. 9 is a schematic fourth operational view of the first embodiment of the present invention.

Referring to FIGS. 6-9, when inserting the tray 31 into the inside of the housing 11, the user can push the tray 31 toward the inside of the housing 11 by fingers, as shown in FIG. 6 and FIG. 7. At this time, the front edge of the tray 31 touches the actuation portion 52 of the elastic interference device 51 at first, forcing the elastic interference device 51 outwards. As illustrated in FIG. 8, the bent 53 and extension portion 54 of the elastic interference device 51 are stopped against one lateral side of the tray 31 at this time. As illustrated in FIG. 9, when continuously pushing the tray 31 to the rear end, the elastic interference device 51 will be moved into the recess 34, and at the same time, the elastic member 41 (see FIGS. 6-8) will be compressed to produce an elastic force for pushing the tray 31 toward the outside. When the user released the fingers, the elastic force of the elastic member 41 immediately pushes the tray 31 toward the outside, however the stop wall 35 of the tray 31 is stopped by the extension portion 54 of the elastic interference device 51 at this time, and therefore the tray 31 is maintained in the housing 11. At this time, the tray insertion operation is completely.

Figure 10:
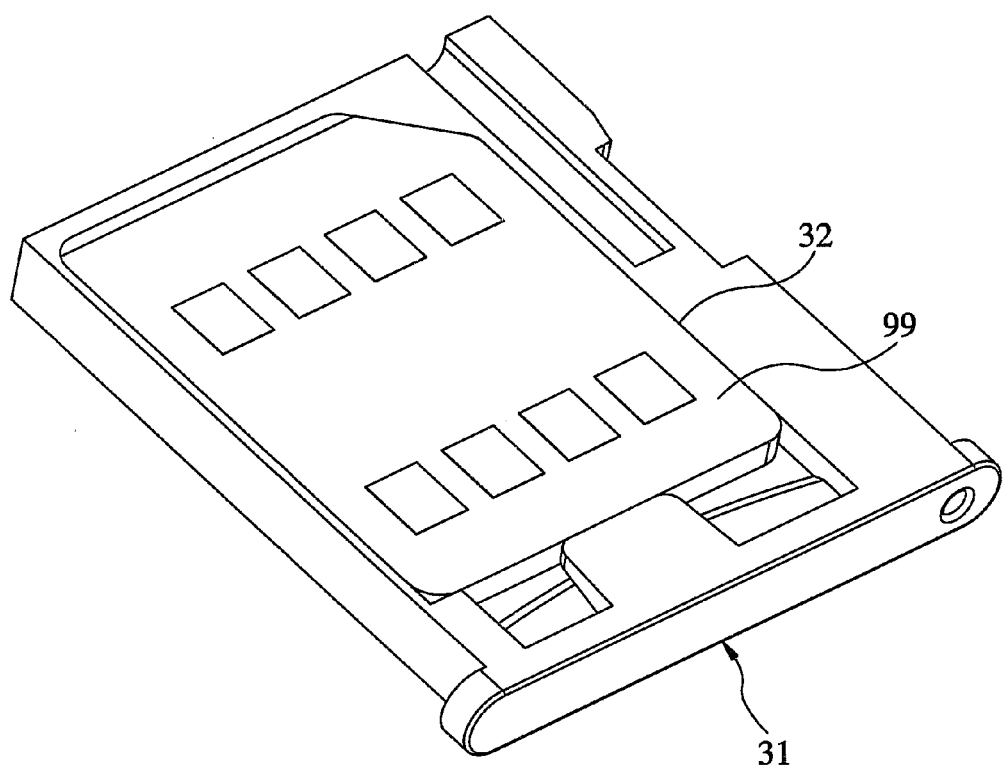
FIG. 10 is a schematic applied view of the first embodiment of the present invention, illustrating an electronic card member set in the tray.

Referring to FIG. 10 and FIG. 3 again, as the card-carrying portions 32 are adapted for carrying electronic card members 99, the above-stated tray insertion operation is performed, after locating of electronic card member(s) 99 on the tray 31, to have the electronic card member(s) 99 be carried into the inside of the housing 11 for allowing the mating terminal set(s) 21 to access to the electronic card member(s) 99 for data reading and/or writing.

Figure 11:
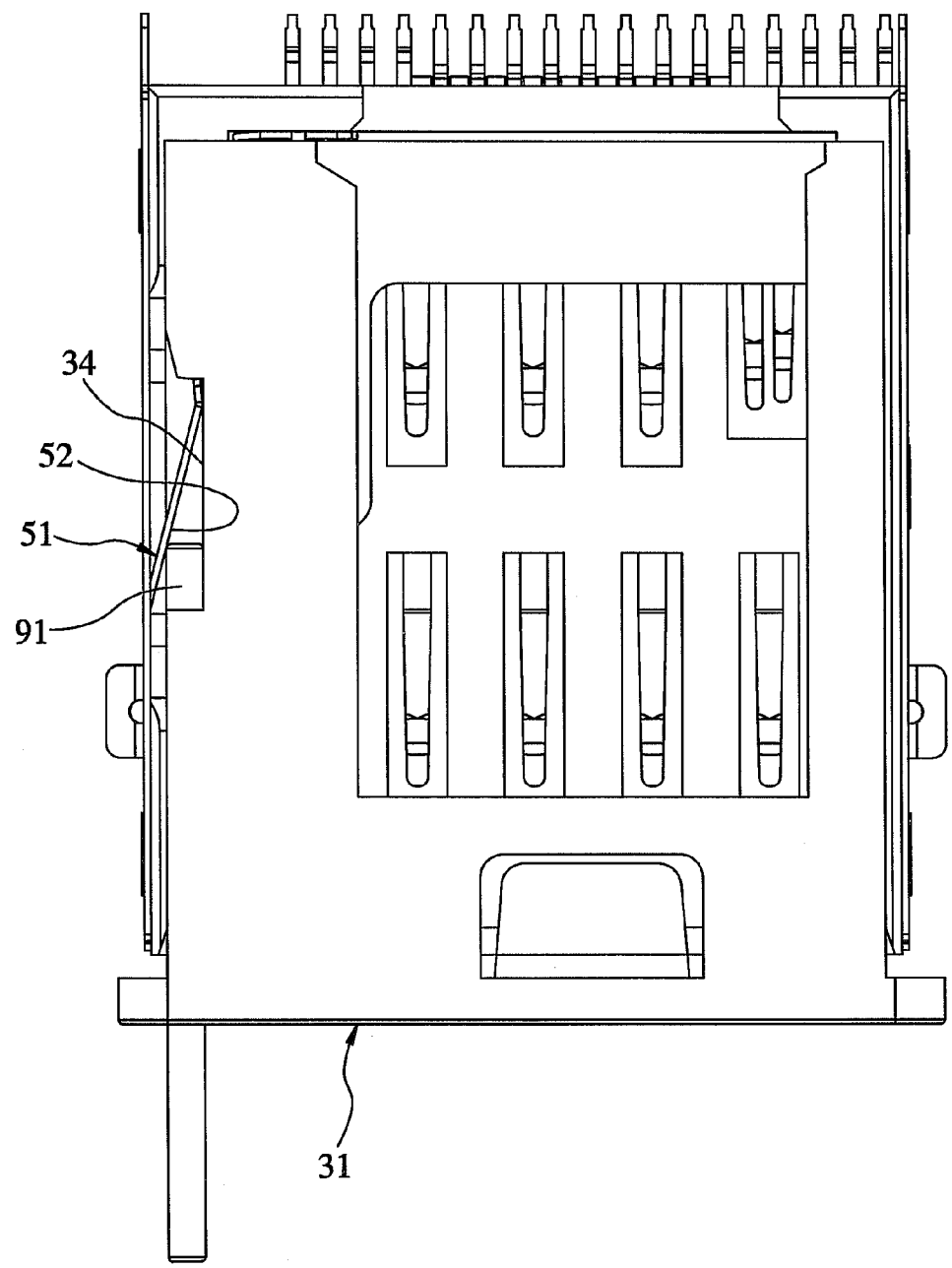
FIG. 11 is a schematic fifth operational view of the first embodiment of the present invention.
Figure 12:
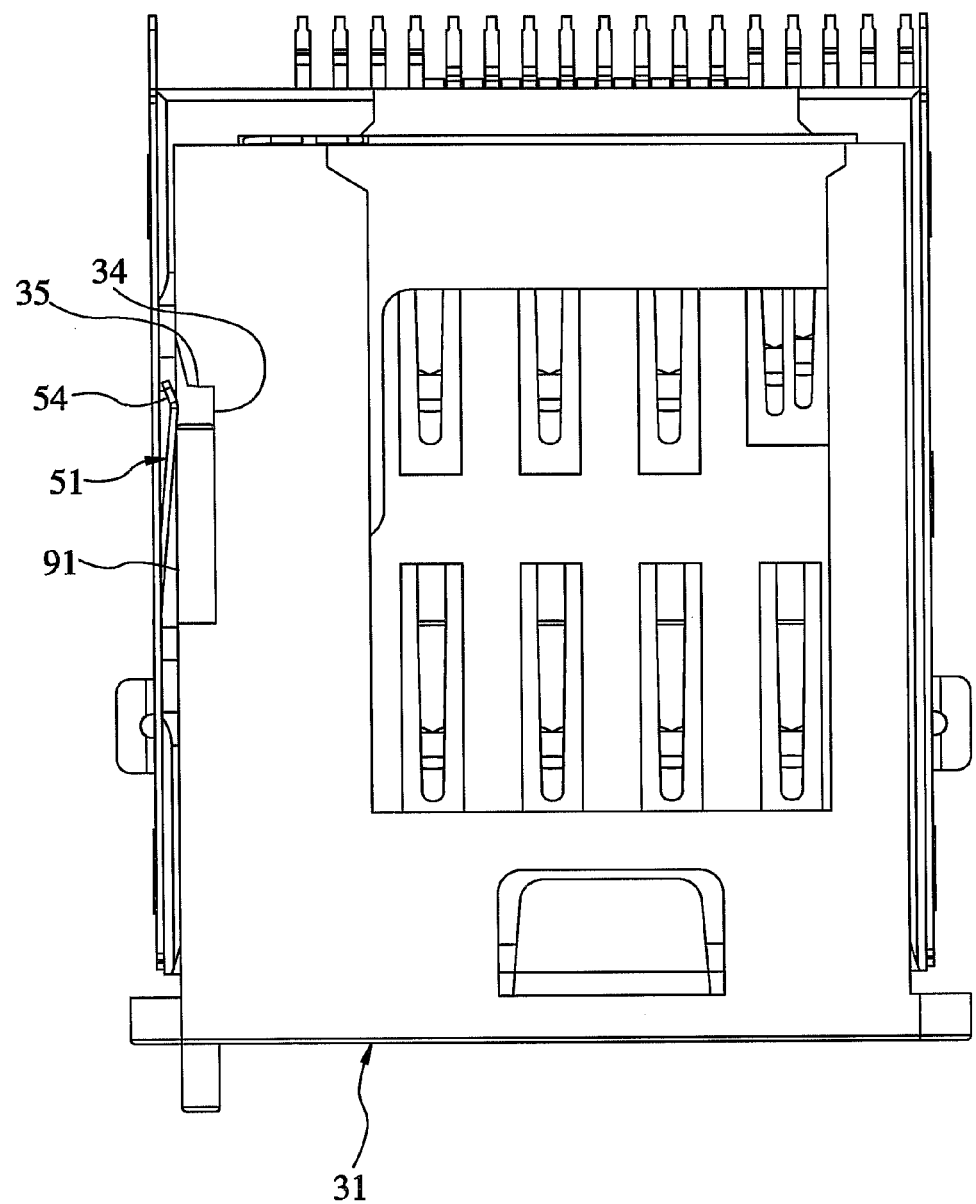
FIG. 12 is a schematic sixth operational view of the first embodiment of the present invention, illustrating the elastic interference device pushed away by the insertion pin before ejection of the tray by the elastic member.
Figure 13:
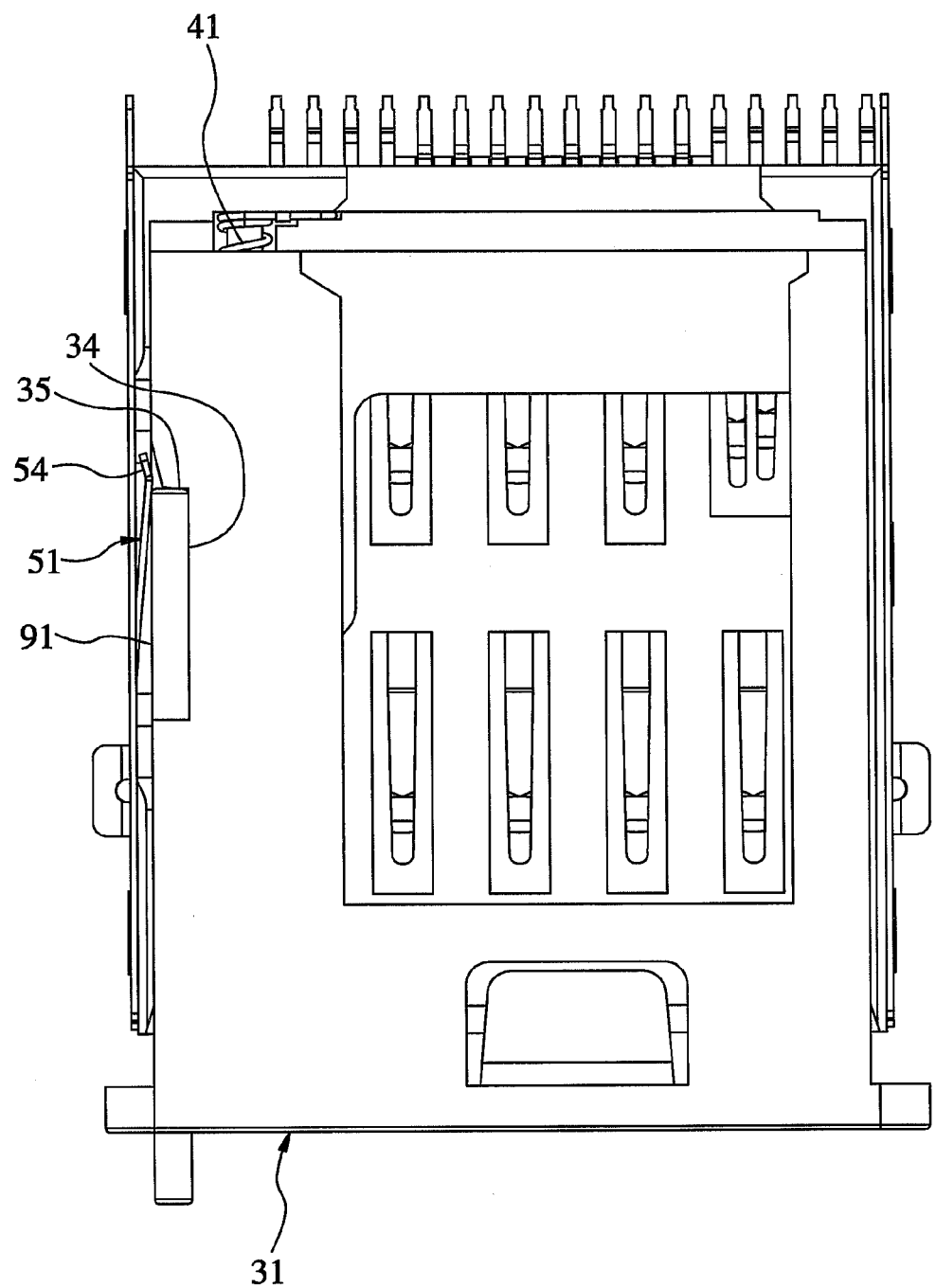
FIG. 13 is a schematic seventh operational view of the first embodiment of the present invention.
Figure 14:
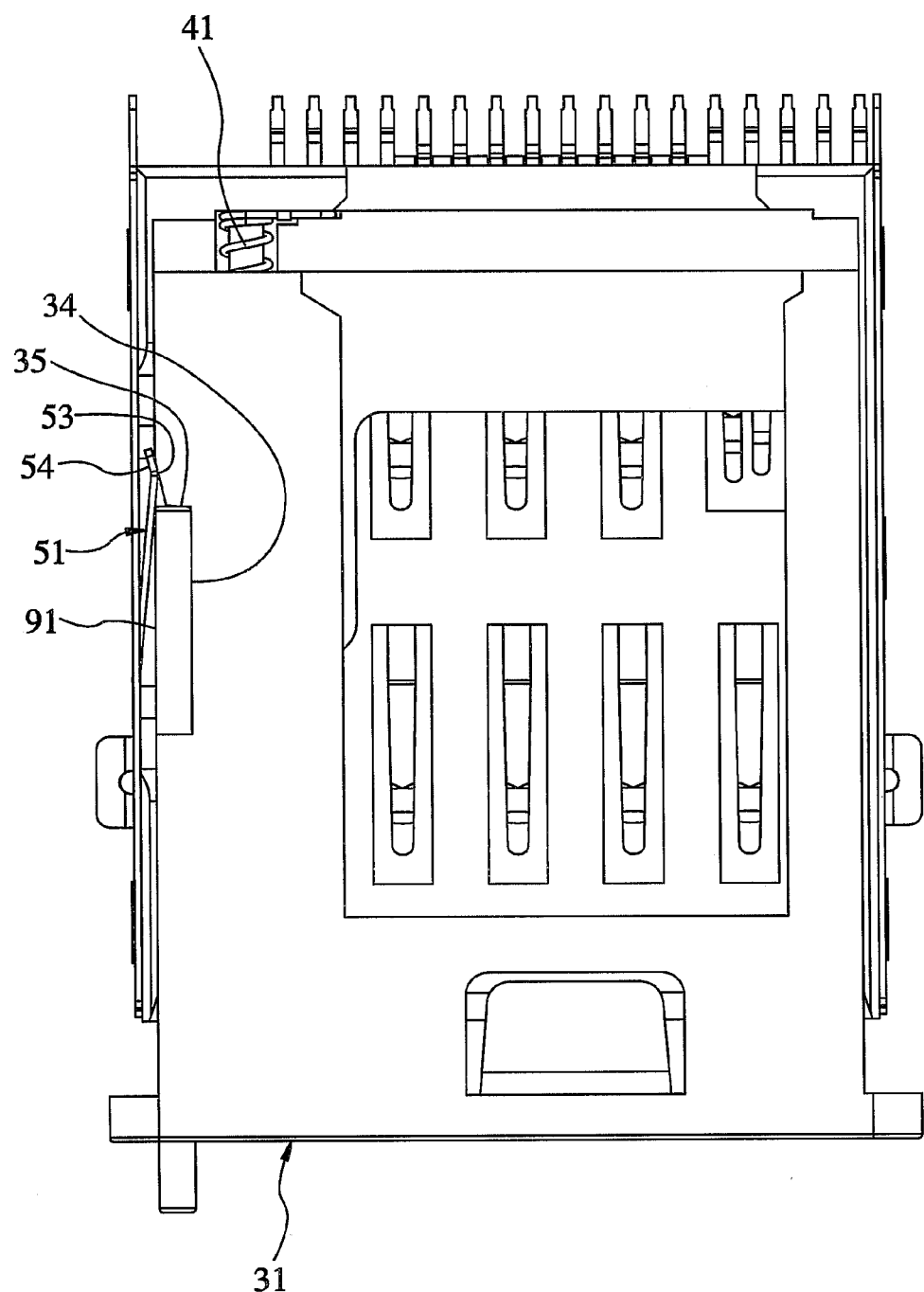
FIG. 14 is a schematic eighth operational view of the first embodiment of the present invention.
Figure 15:
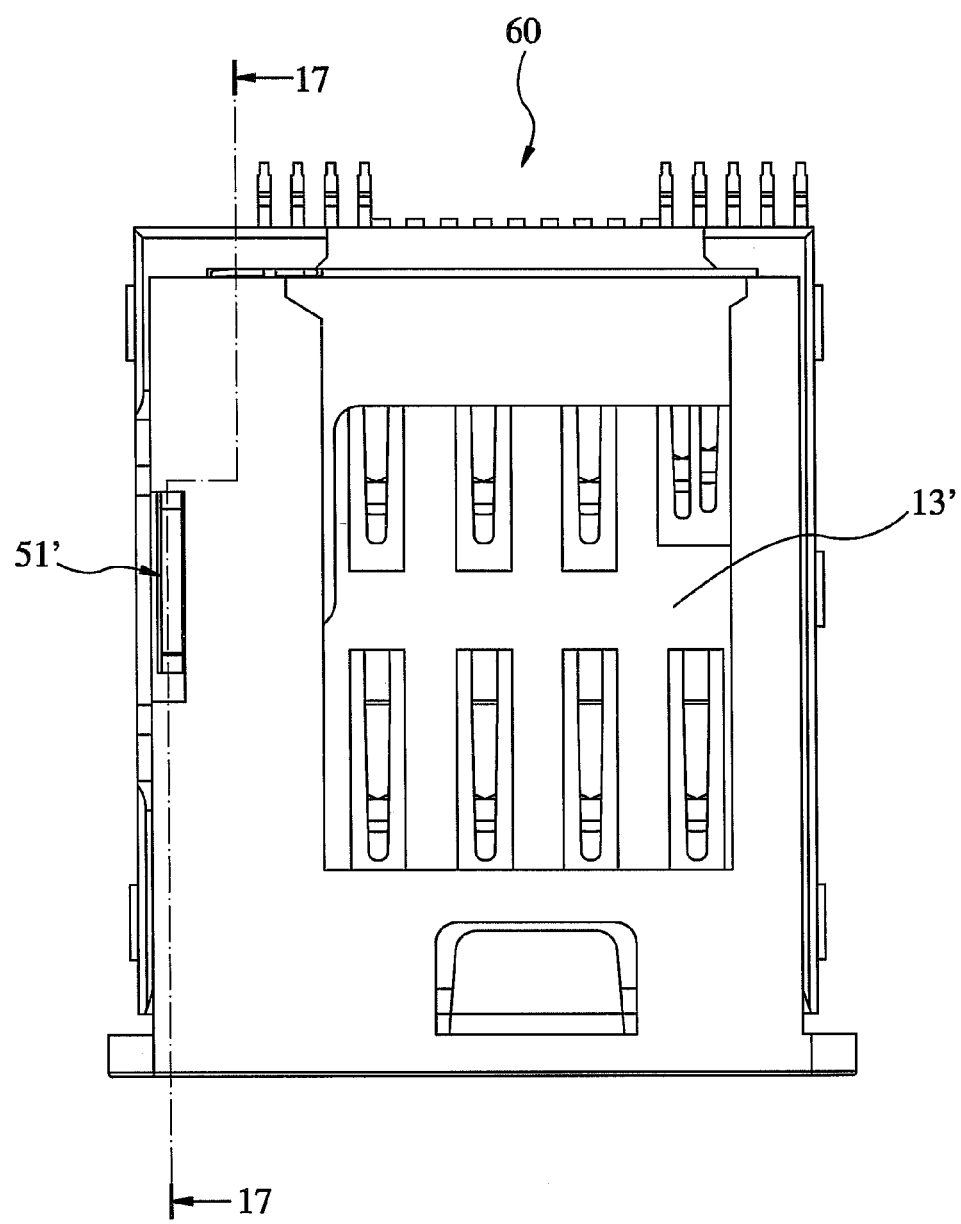
FIG. 15 is a schematic top view of an electrical card connector in accordance with a second embodiment of the present invention, illustrating the tray inserted into the inner end of the housing after removal of the cover shell of the housing.
Figure 16:
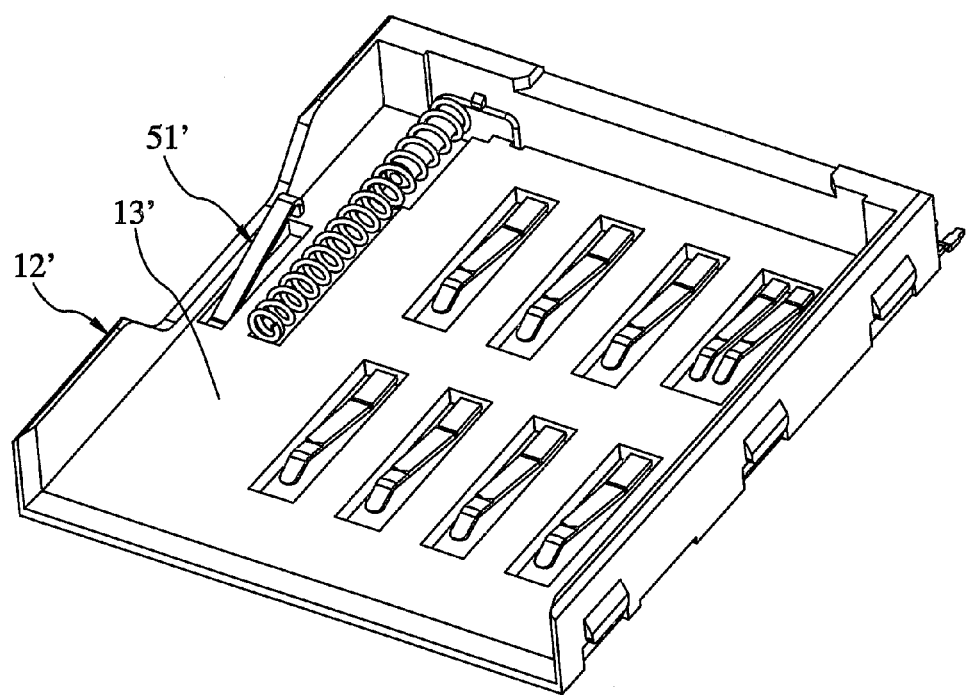
FIG. 16 is an elevational view of a part of the electrical card connector in accordance with the second embodiment of the present invention, illustrating the relationship between the base holder shell and the elastic interference device.
Figure 17:
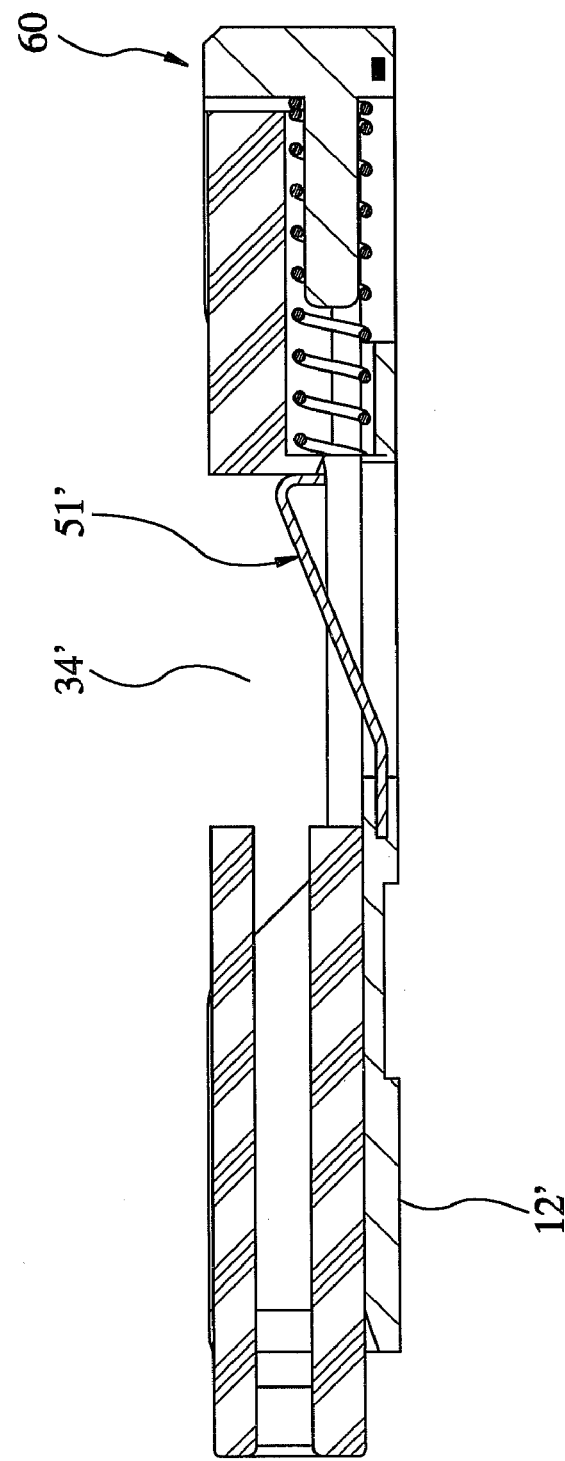
FIG. 17 is a sectional view taken along line 17-17 of FIG. 15.

Referring to FIGS. 11-14 and FIG. 3 again, when going to eject the tray 31 out of the housing 11, insert an insertion pin 91 into the insertion hole 36, as shown in FIG. 11, to let the insertion pin 91 by guided by the pin guide 37 into the recess 34 against the actuation portion 52 of the elastic interference device 51, as shown in FIGS. 12~14. Thereafter, continuously push the insertion pin 91 forwards to push the elastic interference device 51 away from the recess 34. At this time, the extension portion 54 of the elastic interference device 51 is moved away from the recess 34 and released from the stop wall 35 of the tray 31, allowing the tray 31 to be ejected out of the housing 11 by the elastic force of the elastic member 41. Thus, the user can hold the front side of the tray 31 by hand and pick up the tray 31. If the tray 312 carries the electronic card members 99 at this time, the user can pick up the electronic card members 99 from the tray 31. During outward movement of the tray 31, the elastic restore force of the elastic interference device 51 forces the bent 53 to stop against one lateral side of the tray 31. After the tray 31 completely moved out of the housing 11, the elastic interference device 51 returns to the inside the accommodation chamber 13.

Further, in the aforesaid first embodiment of the present invention, the elastic interference device 51 comprises the said bent 53 and the said extension portion 54. The design of the bent 53 and the extension portion 54 simply facilitates smooth movement of the tray 31 in and out of the housing 11. Without the bent 53 and the extension portion 54, the elastic interference device 51 can still perform the function of interfering with the recess 34 and stopping against the stop wall 35 by means of its rear end, i.e., the bent 53 and the extension portion 54 are not requisite components.

FIGS. 15~18 illustrate an electrical card connector 60 in accordance with a second embodiment of the present invention. This second embodiment is substantially similar to the aforesaid first embodiment with the exception of the characteristics outlined hereinafter.

The elastic interference device 51' is not extended from one side of the cover shell. It is a metal spring leaf partially embedded in the base holder shell 12' and partially projecting into the accommodation chamber 13'.

Figure 18:
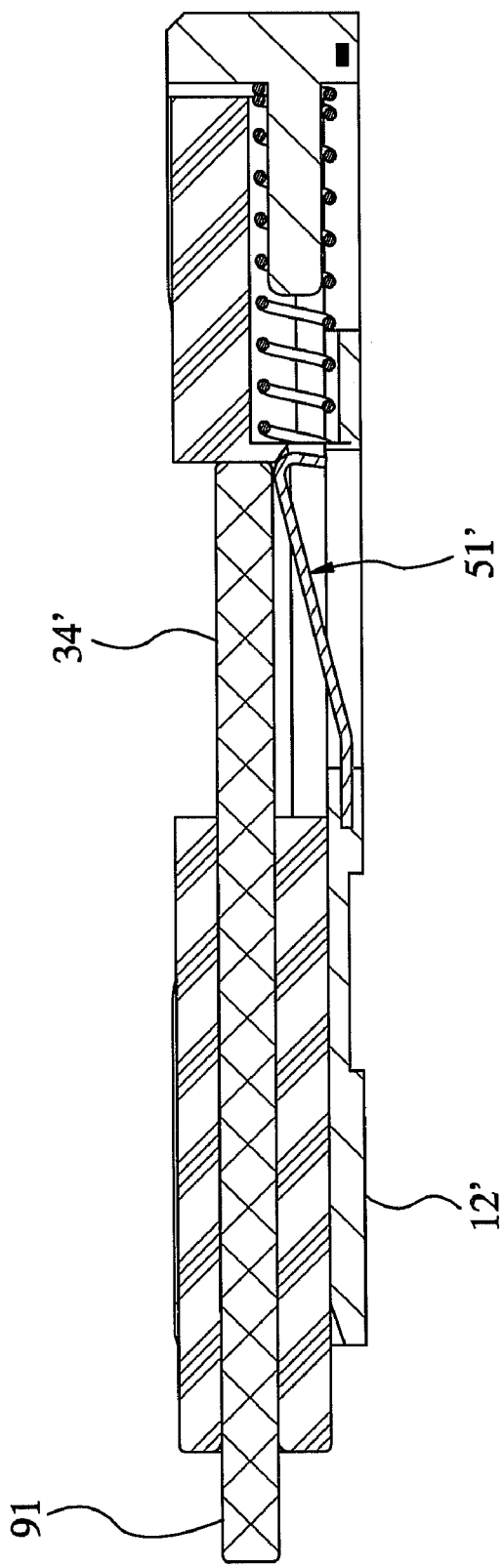
FIG. 18 is a schematic drawing illustrating an operation status of the electrical card connector in accordance with the second embodiment of the present invention.

During operation, unlike the aforesaid first embodiment, as shown in FIG. 18, the elastic interference device 51' moves downwards when pushed away from the recess 34' by the insertion pin 91.

It is to be understood that the elastic interference device can be an elastic plastic strip formed integral with the base holder shell, achieving the same effect as the example of metal spring leaf. As the integrated molding technique is of the known art, no further detailed description or illustration is necessary.

Further, in this second embodiment, the elastic interference device can extend directly from the cover shell, and can move upwards when it is pushed away from the recess by the insertion pin. This arrangement is a simple structural modification without departing from the spirit and scope of the invention, no further illustration is necessary.

The other structural details and the effects of this second embodiment are same as the aforesaid first embodiment, and therefore no further description is necessary.

In conclusion, the invention provides an electrical card connector using a tray for carrying an electronic card member or a plurality of electronic card members, which has the characteristics of simple structure and ease of use, allowing ejection of the card-carrying tray 31 by means of the insertion of an insertion pin 91.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electrical card connector, comprising:
   a housing defining an accommodation chamber therein and an insertion opening at a front side thereof in communication with said accommodation chamber;
   at least one terminal set each consisting of a plurality of metal conducting terminals, at least one said terminal set being mounted in said housing and extending to the inside of said accommodation chamber;
   a tray inserted through said insertion opening into the inside of said housing, said tray comprising at least one card-carrying portion for carrying at least one electronic card member, said at least one card-carrying portion being kept in said accommodation chamber to force the loaded at least one electronic card member into electric contact with said at least one terminal set respectively when said tray is inserted into said housing, a recess at a predetermined location, a stop wall disposed at one side of said recess, a pin hole located on a front side thereof, and a pin guide forming between said pin hole and said recess for guiding an insertion pin that is inserted into said pin hole for enabling a front end of said insertion pin to enter said recess;
   an elastic member set between said housing and said tray and adapted for ejecting said tray out of said housing; and
   an elastic interference device mounted in said housing and projecting into the inside of said accommodation chamber to a predetermined distance, said elastic interference device being interfered with said recess and stopped against said stop wall to prohibit said tray from being ejected out of said housing by said elastic member when said tray is inserted into said housing, said elastic interference device comprising an actuation portion extending backwardly obliquely from a body thereof toward the side of said accommodation chamber and forcible by said insertion pin to move said elastic interference device out of said recess and away from said stop wall upon insertion of said insertion pin into said recess.

2. The electrical card connector as claimed in claim 1, wherein said stop wall is located on a rear side of said recess.

3. The electrical card connector as claimed in claim 1, wherein said housing comprises a base holder shell, and a cover shell covering said base holder shell; said at least one terminal set is mounted in one of said base holder shell and said cover shell.

4. The electrical card connector as claimed in claim 3, wherein said elastic interference device extends from said cover shell toward the inside of said accommodation chamber.

5. The electrical card connector as claimed in claim 3, wherein said elastic interference device is a metal spring leaf partially embedded in said base holder shell and partially projecting into the inside of said accommodation chamber.

6. The electrical card connector as claimed in claim 1, wherein said elastic member is a compression spring having a mounting portion extended from a rear end thereof and affixed to said housing.

7. The electrical card connector as claimed in claim 6, wherein said housing comprises a locating pin, and a retaining portion; the rear end of said elastic member is sleeved onto said locating pin of said housing; said mounting portion of said elastic member is affixed to said retaining portion of said housing.

8. The electrical card connector as claimed in claim 1, wherein said pin guide is an elongated groove located on said tray for guiding said insertion pin into said recess.

9. The electrical card connector as claimed in claim 1, wherein said elastic interference device has a rear end thereof terminating in a bent and then an extension portion.

* * * * *